US007429102B2

(12) United States Patent
Sun

(10) Patent No.: US 7,429,102 B2
(45) Date of Patent: Sep. 30, 2008

(54) PRECISION INKJET PRINTING OF EPOXY COMPOUNDS

(76) Inventor: Jing X. Sun, 655 Gingermill La., Lexington, KY (US) 40509

( * ) Notice: Subject to any disclaimer, the term of this patent is extended or adjusted under 35 U.S.C. 154(b) by 305 days.

(21) Appl. No.: 11/181,482

(22) Filed: Jul. 14, 2005

(65) Prior Publication Data

US 2007/0013746 A1 Jan. 18, 2007

(51) Int. Cl.
*C09D 11/00* (2006.01)

(52) U.S. Cl. ...................................... 347/100; 523/160

(58) Field of Classification Search ................. 347/100; 523/160

See application file for complete search history.

(56) References Cited

U.S. PATENT DOCUMENTS

| | | | | |
|---|---|---|---|---|
| 5,246,984 | A | 9/1993 | Darwen et al. | |
| 5,344,856 | A | 9/1994 | Klein | |
| 5,350,784 | A | 9/1994 | Darwen et al. | |
| 6,071,565 | A | 6/2000 | Chiao | |
| 6,221,934 | B1 | 4/2001 | Stark et al. | |
| 6,652,634 | B1 | 11/2003 | Akers, Jr. et al. | |
| 2002/0049262 | A1 * | 4/2002 | Shimada et al. | 523/412 |
| 2004/0102541 | A1 * | 5/2004 | Sacoto et al. | 523/160 |

FOREIGN PATENT DOCUMENTS

JP 2003119245 A * 4/2003

OTHER PUBLICATIONS

U.S. Appl. No. 11/148,610.

* cited by examiner

*Primary Examiner*—Manish S. Shah
*Assistant Examiner*—Laura E Martin

(57) ABSTRACT

Thermal inkjet printing through nozzles of width of about 25 microns or less is done with an ink having epoxy material suspended in the ink by a graft polymer having acid or other hydrophilic backbone, a hydrophobic side chain, and a stabilizing side chain, in which the molar ratio of hydrophilic moiety to hydrophobic moiety to stabilizing moiety is about 6:1:1 to 0:10:1 respectively.

12 Claims, No Drawings

PRECISION INKJET PRINTING OF EPOXY COMPOUNDS

TECHNICAL FIELD

This invention relates to the accurate and controlled printing through inkjet nozzles of active materials, specifically active epoxy compounds.

BACKGROUND OF THE INVENTION

To achieve precise printing of materials by inkjet printing through nozzles, the nozzle holes must be about 25 microns wide or smaller. Ink or other liquid printed necessarily must be capable of passing through such holes repeatedly without leaving residue, which blocks the holes, or without otherwise blocking the holes.

Precision printing of epoxy materials can be important to make, for example, customized electrical circuits or decorative patterns by inkjet printing. The customized patterns, which may be text or a product code, for example, is readily varied using the electronic controls of modern printers. The epoxy compound is applied as a lamination with another material with which it polymerizes, such as an amine or amide.

This invention is directed to printing epoxy compounds using thermal expulsion of the ink by vaporizing the ink. The primary liquid of the ink is water. The typical epoxy materials of interest for such printing is not soluble in water and, if emulsified in water with current technology, would be in large particle size with high viscosity that would not pass through or would block such nozzle holes in a short duration of printing.

Accordingly, a need exists to emulsify in water epoxy compounds in small sizes of about 300 nanometers in diameter or less and with reasonable viscosity.

DISCLOSURE OF THE INVENTION

Thermal inkjet printing through nozzles of maximum width of about 25 microns or less is done with an ink having epoxy material suspended in the ink by a graft polymer having acid or other hydrophilic backbone, a hydrophobic side chain, and a stabilizing side chain, in which the molar ratio of hydrophilic moiety to hydrophobic moiety to stabilizing moiety is about 6:1:1 to 0:10:1 respectively. The weight average molecular weight is about 8,000 to 20,000.

DESCRIPTIONS OF PREFERRED EMBODIMENTS

Pigments containing aromatic groups are known to be well dispersed by dispersants having aromatic side chains. Epoxy materials, many containing aromatic functional groups, are best emulsified similarly. That will give the greatest interaction between the two components. However, with respect to epoxy materials it seems that water solubility of the emulsifier is also more important. It provides the emulsion the stability in water.

The stability mainly comes from two mechanisms, steric and electrostatic from non-ionic and ionic groups. It is acceptable to use two materials to provide both of the stability required, but if one compound can provide both of the functionality, it will make the emulsion system much simpler.

Another function of the emulsifier is providing the ink jetability. The emulsifier should have good water solubility and ink humectant compatibility. An important feature of this invention is the use of certain high molecular weight polymeric dispersants in the emulsifying of the epoxy resins. This specific dispersant provides strong interaction with the organic humectants or other organic solvents, and with especially the aromatic-functionality-containing epoxy compounds. Use of typical surfactants would be excessive amount for inkjet printing, as such amount would not only affect the required surface tension of the ink, but also affect the final film-forming property.

This invention overcomes the excess surfactant problem, and it provides the ability to control the particles size and particle size distribution. It provides excellent inkjet printer jetability and reliability.

An emulsifier of this invention may contain several acid groups on the polymer backbone that can be used in the curing at elevated temperature to prevent the migration of the free emulsion on the curing film.

The polymeric dispersant of U.S. Pat. No. 6,652,834 B1 to Akers, Jr. et al. is a graft co-polymer, preferably ter-polymer made by a free radical polymerization process. It preferably contains three functional parts in the backbone structure, namely a hydrophilic component, a hydrophobic component and a protective colloid, stabilizing component. For making the oil in water emulsions of this invention, the polymeric dispersant of the foregoing U.S. Pat. No. 6,652,834 preferably has a weight average molecular weight from about 3000 to 20,000 as determined by gel permeation chromatography, and molar ratio of the three components preferably of about 6:1:1 or less.

In using the polymeric dispersant as the emulsifier in accordance with this invention, the acid, hydrophilic unit is in the molar number range of from 0 to 10, the nonylphenyl ppg hydrophobic unit is in the molar number range of from 1 to 5. The SIPOMER poly(ethylene glycol)2,4,6-tris-(1-phenylethyl)phenyl ether methacrylate stabilizing unit is in the molar number range of from 1 to 6. Depending on the hydrophobicity of the epoxy compound to be emulsified, the ratio of the three components of the dispersant is variable. The preferred ratio is from 0:1:1to 10:1:1. The most preferred ratio is about 1:1:1. It is possible to combine the hydrophgobic and stabilizing groups into one component, depending on the required stability and viscosity of the emulsion.

The hydrophilic component of the polymeric dispersant is preferably an ionic monomer segment, which may be selected from acrylic acid, methacrylic acid, crotonic acid, or other acid containing monomers. The hydrophilic component may be non-ionic, such as a methacrylated polyethylene glycol. The hydrophilic segment preferably provides electron static stability to the polymeric dispersant.

The hydrophobic component of the polymeric dispersant preferably contains electron rich functional groups. Such functional groups exhibit strong interaction or adsorption properties with respect to epoxy molecules. Preferred groups that provide the electron rich functional groups include nonylphenyl, mono-, di-, and tri-styrene phenyl, and stearyl.

Examples of such monomers include, but are not limited to, polymerizable monofunctional vinyl monomers from Toagosei Co. of Tokyo, Japan under the trade name ARONIX M-117, mono-methacryloxypropyl terminated polydimethylsiloxane from Gelest, Inc. of Morrisville, Pa. under the trade name MCR-M11, and polydimethylsiloxane-co-polypropylene glycol methacrylate from Chisso Corporation of Tokyo, Japan. Non-siloxyl hydrophobic monomers may be derived from long chain aliphatic groups, long chain alcohols, and alkyl aryl alcohols. Examples of such materials preferably include stearyl or lauryl acrylate or methacrylate or nonylphenol acrylate or methacrylate.

Another important component of the polymeric dispersant is the protective colloid, stabilizing component. This component provides extra stability to the ter-polymer in aqueous systems. Use of this component substantially reduces the amount of ionic monomer component needed thereby increasing the non-ionic water solubility of the polymeric dispersant. This component also helps to stabilize the dispersion in lower acidic and in aqueous/alcoholic media. The protective colloid component can also provide the hydrophobic functional group that has a strong interaction or attraction for the resins. The protective colloid component may be selected from either a reactive surfactant or a protective colloid macromer material.

Examples of reactive surfactants include, but are not limited to, nonylphenoxy poly(ethyleneoxy) acrylate (containing from 1 to about 40 moles of ethylene oxide), nonylphenoxy poly(ethyleneoxy) methacrylate (containing from 1 to about 40 moles of ethylene oxide),), Tristyrenenated phenoxy poly(ethyleneoxy) methacrylate (containing from 1 to about 40 moles of ethylene oxide), nonylphenoxy poly(ethyleneoxy) crotonate (containing from about 5 to about 40 moles of ethylene oxide), bis-nonylphenoxy poly(ethyleneoxy) fumarate (containing from about 5 to about 40 moles of ethylene oxide), phenoxy-poly(ethyleneoxy) acrylate (containing from about 5 to about 40 moles of ethylene oxide), perfluoroheptoxypoly(propyloxy) acrylate, perfluoroheptoxypoly(propyloxy) methacrylate, sorbitol acrylate, sorbitol methacrylate, and allyl methoxy triethylene glycol ether, alkyloxy poly(ethyleneglycol)methacrylate.

The protective colloid or reactive surfactant segment has a weight average molecular weight preferably ranging from about 200 to about 2,000, preferably from about 200 to about 1,600. The colloid or reactive surfactant segment must include a moiety, which enables it to attach to the backbone hydrophilic segment of the polymer. For example, the colloid or reactive surfactant segment may be attached through an acrylic group. The colloid and reactive surfactant segments contain both electron-rich hydrophobic parts and hydrophilic parts and not only function as surfactants in the conventional manner but also tend to effectively uniformly coat insoluble particles in a dispersion.

Preferred protective colloid or reactive surfactant segments include nonylphenoxy PEG-10 methacrylate, where PEG is polyethylene glycol. Particularly preferred protective colloid materials are derived from nonlyphenyl polyethylene glycol methacrylate, mono-, di-, and tri-styrenated phenyl polyethylene glycol methacrylate, and stearyloxy polyethylene glycol ether methacrylate. The most preferred protective group includes poly(alkylene glycol)2,4,6-tris-(1-phenylethyl)phenyl ether methacrylate and its di and mono derivatives wherein the alkylene group contains from 3 to 10 carbon atoms. A commercially available protective colloid group includes poly(ethylene glycol)2,4,6-tris-(1-phenylethyl)phenyl ether methacrylate available from Rhodia, USA of Cranbury, N.J. under the trade name SIPOMER/SEM 25, and other monomers from Monomer-Polymer & Dajac Labs, Inc. of Feasterville, Pa.

The preferred polymeric dispersant segments may be represented by the following formulas:

Hydrophobic Segment:

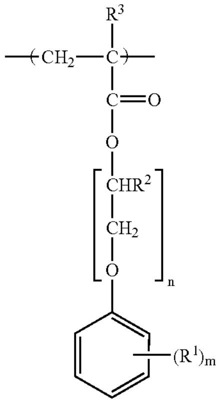

wherein n is an integer from 0 to 20, m is an integer from 1 to 3, and each $R^1$ is independently selected from $C_1$-$C_9$ alkyl, or aryl-$C_1$-$C_9$ alkyl, provided that at least one of said $R^1$ is aryl-$C_1$-$C_9$ alkyl, and each $R^2$ and $R^3$ is independently selected from H and $-CH_3$.

The pendant chains of the polymer include at least one hydrophobic segment and at least one protective colloid or reactive surfactant segment as described above.

Stabilizing Segment:

A substituted acrylate ester monomer wherein the alkyl group of the methacrylate ester is replaced with (ethylene glycol)2,4,6-tris-(1-phenylethyl)phenyl is shown in the following formula:

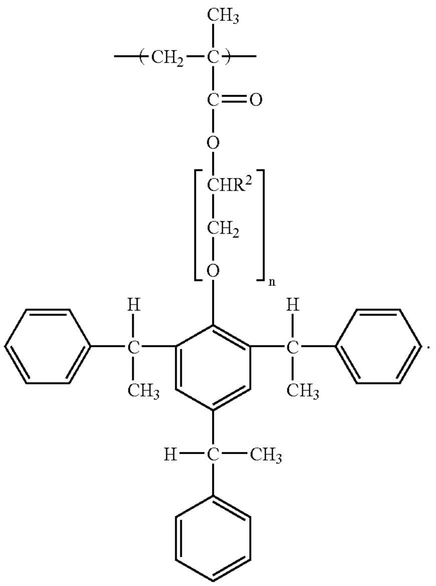

wherein n is 1 to 30, and $R^2$ is independently selected from H and $—CH_3$.

The polymeric dispersant as set forth above can be used to disperse organic soluble resin, colorant, wax, and mixtures thereof. The hydrophobicity of the polymeric dispersant can be varied by changing the ratios of the monomeric segments.

The hydrophilic segment of the polymeric dispersant is responsible for stabilizing the colorant in an aqueous medium at a pH above about 7. The amount of hydrophilic groups on the dispersant for the current purpose is preferably as low as possible for this application. Consequently, the preferred molar ratio of the hydrophilic segment to the hydrophobic segment and protective colloid segment preferably ranges from about 6:1:1 to about 0:10:1.

The hydrophobic segment of the polymeric dispersant is responsible for anchoring the polymeric dispersant to the particles. Electron donor/acceptor interactions via aromatic groups and hydrogen bonding are preferred for effective binding of the components It is particularly preferred to include aromatic groups in the hydrophobic segment of the dispersant. Therefore, the preferred hydrophobic segment comprises a polymer or copolymer containing electron rich functional groups such as aromatic groups, including but not limited to alkyl aromatic groups and substituted aromatic groups.

Preferred hydrophobic groups include polypropylene glycol nonylphenylether acrylate from Toagosei Co. under the trade name ARONIX M-117 and BLEMMER ANP, ANE, NEP series from NOF Corporation.

Although it contains both hydrophilic and hydrophobic segments, the electron rich nature of the 2,4,6-tris(1-phenylethyl)phenyl ether methacrylate makes it an excellent hydrophobic moiety for this application. By establishing a strong interaction with the hydrophobic compounds, this monomer stabilizes the epoxy dispersion in an aqueous medium. The monomer has a weight average molecular weight of from about 200 to about 5,000, preferably of from about 300 to about 2,000.

The hydrophilic and hydrophobic segments are assembled into a graft copolymer.

A further embodiment of the present invention comprises a polymer comprising random repeat units derived from:

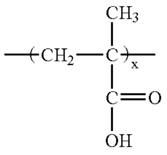

wherein x ranges from about 0 to about 20, preferably about 1 to about 6;

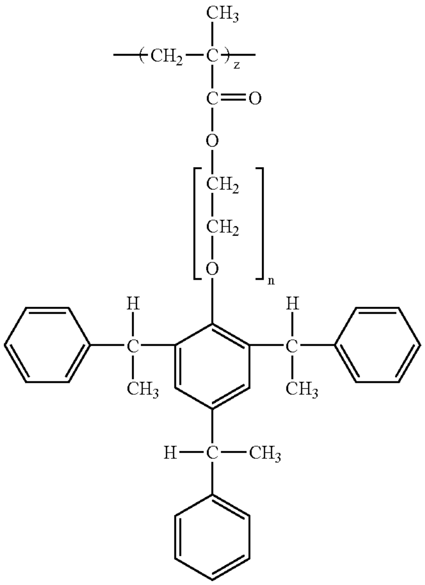

wherein z ranges from 0 to 5, preferably 1, and n ranges from 1 to 40. preferably from 1 to 25; and

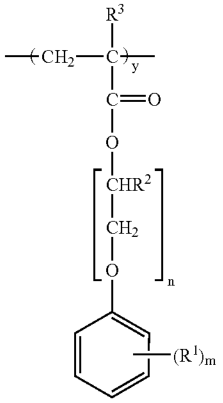

wherein y is an integer from 0 to 10, n is an integer from 1 to 20, m is an integer from 1 to 3, and each $R^1$ is independently selected from $C_1$-$C_9$ alkyl, or aryl-$C_1$-$C_9$ alkyl, provided that at least one of said $R^1$ is aryl-$C_1$-$C_9$ alkyl, and each $R^2$ and $R^3$ is independently selected from H and —$CH_3$.

The graft copolymers of the present invention can be made by standard synthetic techniques such as those described in Odian's *Principles of Polymerization,* 3rd Edition, John Wiley and Sons, Inc. (1991). However, free radical polymerization is the preferred method of synthesis.

A free radical polymerization reaction uses initiators and chain transfer agents to control the polymer molecular weight and terminate the reaction. Any conventional free radical initiator and chain transfer agent materials known in the art may be used in the present invention to make the dispersant as long as they are compatible with the reactants being used. Suitable free radical initiators include the azo-type and peroxide-type initiators (preferably the azo-type). Preferred initiators include dimethyl 2,2'-azobisisobutyrate (V-601) from Waco Chemical & Supply Co. Preferred chain transfer agents include $C_1$-$C_{20}$ (preferably $C_8$-$C_{12}$) alkylthiol groups. Particularly preferred is n-$C_{12}$ thiol. Other appropriate chain transfer agents include phenylalkyl mercaptans, or 3-mercapto-1,2propanediol.

An example of free radical polymerization of a polymeric dispersant according to the invention is illustrated below. This example is provided for illustrative purposes only, and is not intended to restrict or limit the scope of the invention.

POLYMERIC DISPERSANT EXAMPLE A

A polymeric dispersant of the present invention was made as follows: A solution of 403.55 grams SIPOMER SEM-25 (containing 60% active ingredient, 20% methacrylic acid and 20% water); 63.41 grams ARONIX M-117 (polymerizable monofunctional vinyl monomers available from Toagosei Co. of Tokyo, Japan); 5.02 grams 1-dodecanethiol; (2% by mole) and 0.73 grams dimethyl 2,2'-azobisisobutyrate (V-601) from Waco Chemical & Supply Co. of Dalton, Ga., was mixed in 196 g isopropyl alcohol (IPA) in a three neck round bottom flask which was equipped with a mechanical stirrer, a condenser and a thermometer. (Optionally, the methacrylic acid may be removed by ultrafiltration.) The chemicals were mixed together and degassed with nitrogen (done by repeated partial evacuation followed by backfill using a Firestone Valve). The flask was back filled with the nitrogen, then immersed, in an oil bath and heated to about 78° C. with good stirring for about 18 hours. The product is dried in the oven at 80° C. The molecular weight of the dispersant was determined by gel permeation chromatography. The resulting product was dissolved in deionized water with heating. The temperature was controlled to below 50° C. and the pH was adjusted to 7.2 by the dropwise addition of 20% KOH to the solution.

Dispersant B and C contain 6% and 10% by mole 1-dodecanethiol separately. The above polymeric dispersant was used as the emulsifier in the following process:

EXAMPLE 1

In a beaker, mixing 7.2 g of bisphenyl A propoxylate diglycidyl ether, 4.2 g of n,n-diglycidyl-4-glycidyloxyaniline, 2 g of the polymeric dispersant A and balance with DI water to 50 g. In an ice water bath, the mixture was ultrasonically agitated for 15 min. The particle size was 194 nm determined by a Microtrac UPA 150. It was filtered through filter cloth. Then 7 g of diethylene glycol are added to it with up to 60 g with DI water. The viscosity was 4.88 cp. This solution was ultrasonically agitated for another 1 min. The mixture is ready for printing.

EXAMPLE 2

In a beaker, mixing 3.7 g of bisphenyl. A propoxylate diglycidyl ether, 4.2 g of n,n-diglycidyl-4-glycidyloxyaniline, 1.61 g trimethamolpropanoltriglycidyl ether, 2 g of the polymeric dispersant B and balance with DI water to 50 g. In an ice water bath, the mixture was ultrasonically agitated for 15 min. The particle size was 165 nm determined by Microtrac UPA 150. It was filtered through the filter cloth. Then 7 g of diethylene glycol are added to it with up to 60 g with DI water. The viscosity was 3.38 cp. This solution was ultrasonically agitated for another 1 min. The mixture is ready for printing.

EXAMPLE 3

In a beaker, is mixed 8.4 g of bisphenyl A diglycidyl ether, 3.2 g triethanopropanol triglycidyl ether, 1.5 g of the polymeric dispersant A and balance with DI water to 50 g. In an ice water bath, the mixture was ultrasonically agitated for 15 min. The particle size was 247 nm determined by use of a Microtrac UPA 150. It was filtered through the filter cloth. Then 7 g of diethylene glycol is added with up to 60 g with DI water. The viscosity was 4.48 cp. This solution was ultrasonically agitated for another 1 min. The mixture is ready for printing.

These solutions printed with high precession by thermal inkjet printing by vaporizing the solution using the laboratory equivalent to the Lexmark Z816 inkjet printer claim is to use the foregoing types of dispersant as the emulsifier in the organic solvent based epoxy resin emulsions.

What is claimed is:

1. A method of inkjet printing comprising thermal expulsion by vaporizing through nozzles of maximum width of about 25 microns a solution of epoxy material emulsified in water by a graft polymer having an hydrophilic backbone, a hydrophobic side chain and a stabilizing side chain having an electron rich part and a hydrophilic part in a molar ratio of about 6:1:1 to 0:10:1 respectively, wherein said epoxy material is an aromatic functionality containing epoxy compound.

2. The method of inkjet printing as in claim 1 in which said hydrophobic side chain comprises

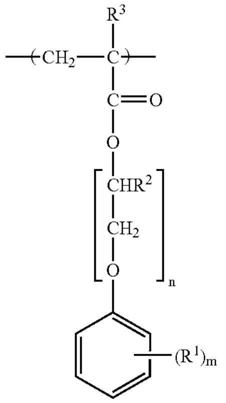

wherein n is an integer from 1 to 20, m is an integer from 1 to 3, and each $R^1$ is independently selected from $C_1$-$C_9$ alkyl, or aryl-$C_1$-$C_9$ alkyl, provided that at least one of said $R^1$ is aryl-$C_1$-$C_9$ alkyl, and each $R^2$ and $R^3$ is independently selected from H and —$CH_3$.

3. The method of inkiet printing as in claim 2 in which said stabilizing side chain comprises

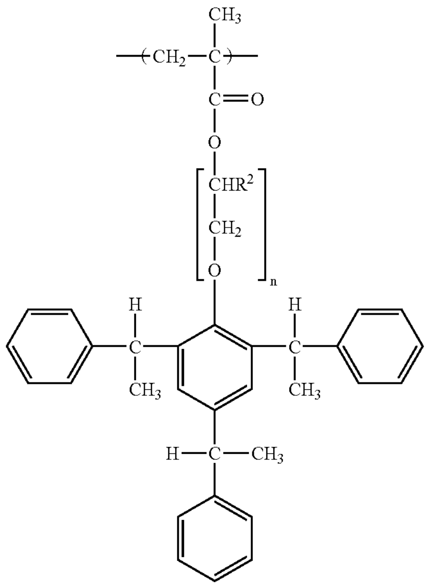

wherein n is 1 to 40, and $R^2$ is independently selected from H and —$CH_3$.

4. The method of inkiet printing of claim 3 in which said molar ration is about 1:1:1.

5. The method of inkiet printing of claim 2 in which said molar ratio is about 1:1:1.

6. The method of inkiet printing as in claim 1 in which said stabilizing side chain comprises

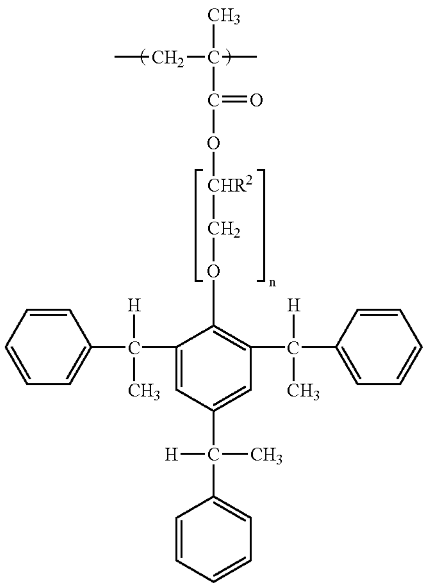

wherein n is 1 to 40, and $R^2$ is independently selected from H and —$CH_3$.

7. The method of inkiet printing of claim 6 in which said molar ratio is about 1:1:1.

8. The method of inkjet printing of claim 1 in which said molar ratio is about 1:1:1.

9. A method of inkjet printing comprising thermal expulsion by vaporizing through nozzles of maximum width of about 25 microns a solution of epoxy material emulsified in water by a graft polymer having an hydrophilic backbone, at least one side chain, said polymer comprising random repeat units derived from:

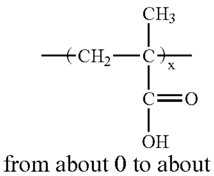

wherein x ranges from about 0 to about 20;

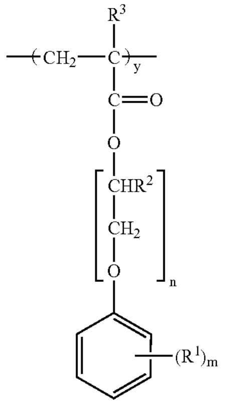

wherein y is an integer from 0 to 10, n is an integer from 1 to 20, m is an integer from 1 to 3, and each $R^1$ is independently selected from $C_1$-$C_9$ alkyl, or aryl-$C_1$-$C_9$ alkyl, provided that at least one of said $R^1$ is aryl-$C_1$-$C_9$ alkyl, and each $R^2$ and $R^3$ is independently selected from H and —$CH_3$; and

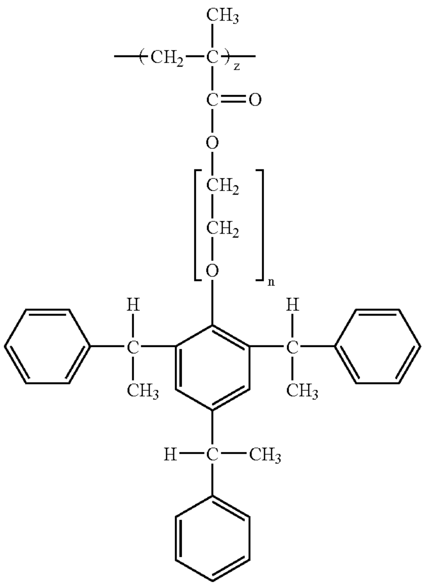
wherein z ranges from 0 to 5, preferably 1, and n ranges from 1 to 40, wherein said epoxy material is an aromatic functionality containing epoxy compound.
10. The method of inkjet printing of claim 9 in which x is in the range of about 1 to about 6.
11. The method of inkjet printing of claim 10 in which z is about 1.
12. The method of inkjet printing of claim 9 in which z is about 1.
* * * * *